United States Patent
Rajamani

[11] Patent Number: 5,896,736
[45] Date of Patent: Apr. 27, 1999

[54] LOAD REJECTION RAPID ACTING FUEL-AIR CONTROLLER FOR GAS TURBINE

[75] Inventor: Ravi Rajamani, Schenectady, N.Y.

[73] Assignee: General Electric Company, Schenectady, N.Y.

[21] Appl. No.: 08/812,830

[22] Filed: Mar. 6, 1997

[51] Int. Cl.[6] .................................................. F02C 9/20
[52] U.S. Cl. ........................................ 60/39.03; 60/39.29
[58] Field of Search ............................ 60/39.03, 39.091, 60/39.27, 39.29

[56] References Cited

U.S. PATENT DOCUMENTS

| | | | |
|---|---|---|---|
| 3,255,586 | 6/1966 | Hennig et al. | 60/39.03 |
| 4,529,887 | 7/1985 | Johnson | 60/39.27 |
| 5,272,637 | 12/1993 | Urushidani et al. | 364/431.02 |
| 5,301,499 | 4/1994 | Kure-Jensen et al. | 60/39.03 |
| 5,487,265 | 1/1996 | Rajamani et al. | 60/39.03 |

FOREIGN PATENT DOCUMENTS

| 74525 | 3/1991 | Japan | 60/39.03 |
|---|---|---|---|

*Primary Examiner*—Louis J. Casaregola
*Attorney, Agent, or Firm*—Donald S. Ingraham; Douglas E. Stoner

[57] ABSTRACT

A rapid acting control system for a gas turbine in an electrical system that is adapted to control fuel and air supply to the turbine to prevent flameout condition in the turbine and includes: a turbine control unit having an air supply controller that controls the position of a plurality of turbine inlet guide vanes (IGVs) in correspondence with at least one turbine condition signal; a load rejection module coupled to the air supplier controller and to a turbine electrical load sensor so as to generate a transient IGV correction signal in correspondence with a sensed turbine electrical load drop condition. A method of operating a gas turbine to maintain the turbine on-line during a loss of load condition includes the steps of sensing a loss of load condition for the turbine; supplying an inlet guide vane correction signal into an air supply controller coupled to control the position of a plurality of turbine IGVs, the IGV correction signal being independent of other turbine operating condition signals applied to the air supply controller; and adjusting the position of the plurality of IGVs in response to the IGV correction signal to adjust the turbine fuel air mixture in the gas turbine to prevent flameout during a loss of electrical load condition. The method typically further includes the step of removing the IGV correction signal after a correction time delay.

22 Claims, 1 Drawing Sheet

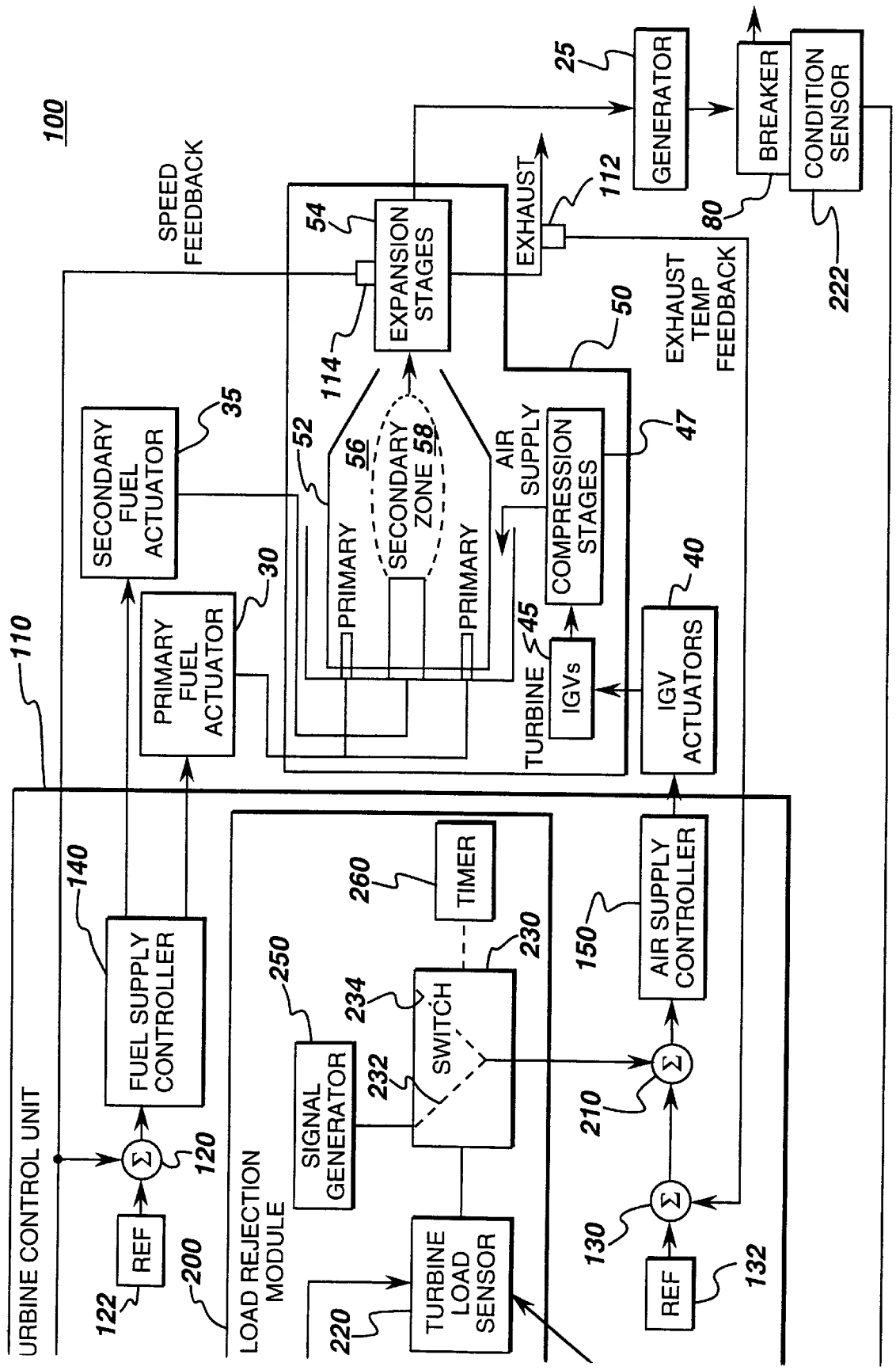

LOAD REJECTION RAPID ACTING FUEL-AIR CONTROLLER FOR GAS TURBINE

TECHNICAL FIELD

This invention relates generally to gas turbines and in particular to a controller for a gas turbine that is adapted to control fuel and air supply to the turbine so as to maintain the turbine in an operating condition even in the event of a loss of electrical load condition.

BACKGROUND OF THE INVENTION

Gas turbines coupled to electric generators are commonly used in power generation service. It is desirable to optimize operation of a gas turbine in order to provide reliable power generation while reducing undesirable emissions from the combustion process in the turbine. For example, the gas turbine combustion process results in generation of, among other things, nitrogen oxides ($NO_x$), unburnt hydrocarbons, and carbon monoxide (CO). Control of such undesirable emissions requires control of the fuel-air ratio (FAR) of the combustible mixture being fed into the combustion chamber of the turbine. One approach to minimize emissions has been to design a turbine so that when it is operating at full load conditions the FAR has an equivalence ratio (actual FAR divided by the stoichiometric FAR) that corresponds to a desired point between the lean burnout point (when turbine combustor flameout occurs because the FAR is too lean) and the rich burnout point (flameout due to FAR being too rich). For emission and fuel economy reasons, turbines are commonly operated with a fuel air mixture for which the equivalence ratio is less than one (that is, leaner than the stoichiometric FAR).

Controllers for gas turbines typically employ a decentralized control strategy in which fuel supply to the turbine and air supply to the turbine are controlled by reference to different measured turbine performance parameters (typically represented by respective turbine condition signals). For example, in a typical gas turbine controller, fuel supply to the turbine is controlled primarily via a feedback loop that seeks to match turbine power output with the electrical load demand on the generator driven by the turbine. This feedback is typically accomplished through monitoring turbine speed, with a speed error signal (that is variation of the measured turbine speed with a reference (or set point) value) being processed to increase or decrease fuel supply to the turbine as appropriate.

Air supply to the turbine in such a system is determined by the compressor inlet geometries which are controlled based on the error between measured turbine exhaust temperature and a reference temperature value; the compressor inlet guide vanes are positioned to increase or decrease air flow into the turbine as necessary to obtain the optimal exhaust temperature. In such a control system, a change in load on the turbine results in a substantially immediate change in fuel flow to the turbine, leading to a change in the power output and exhaust temperature, which change in exhaust temperature causes the controller commanding the inlet guide vanes to appropriately change air flow to the turbine. There is thus a lag between fuel supply control and air supply control. Systems can be designed such that the lag can be acceptable for some range of turbine operating conditions.

The control system lag presents significant challenges, however, in the event of a loss of load condition occurs (e.g., an electrical breaker opens) unloading the electrical generator driven by the turbine. Due to the magnitude of the change in load, the control system lag (that is, the delay in adjusting air supply to the turbine due to the exhaust temperature feedback loop) may cause one or more combustors in the turbine to flame out due to the fuel-air mixture becoming too lean to sustain combustion (too much air admitted for amount of fuel being supplied). Flameout of a sufficient number of combustors results in the turbine control system shutting the turbine down for safety reasons. Such a shutdown takes the turbine off line and necessitates the initiation of a restart process that delays reloading the turbine. The flameout also imposes thermal and mechanical cycles on the turbine that are desirably avoided.

It is thus desirable that a turbine control system be able to control a gas turbine so that the turbine is maintained in an operating condition (e.g., it does not flame out) even in the event of a full load rejection condition.

SUMMARY OF THE INVENTION

In accordance with this invention, a rapid acting control system for a gas turbine in an electrical system is adapted to control fuel and air supply to the turbine over a range of operating conditions so as to maintain the turbine in an operating condition (e.g., combustion is sustained in the turbine so that it is ready for loading) even in the event of a loss of electrical load. Elements of the control system include a turbine control unit that receives respective turbine operating condition signals (e.g., exhaust temperature feedback, turbine speed feedback) and applies respective regulatory function control signals (e.g., for fuel supply control and air supply control) to control turbine operation. The turbine control unit includes an air supply controller that controls the position of a plurality of turbine inlet guide vanes (IGVs) (so as to control air supply to the turbine) in correspondence with at least one of the turbine condition signals. The turbine control unit further includes a load rejection module that is coupled to the air supply controller and to a turbine electrical load sensor so as to generate a transient IGV correction signal in correspondence with a sensed turbine electrical load drop condition, which IGV correction signal is independent of the at least one turbine condition signal supplied to the air supply controller. The turbine load sensor typically is coupled to at least a breaker condition sensor disposed to sense the output electrical breaker condition for an electrical generator driven by the gas turbine, or alternatively to a turbine speed sensor so as to detect rapid turbine acceleration towards a load drop condition setpoint. The load rejection module typically further includes a timer that is coupled to a switch that is also responsive to the turbine load sensor; the switch is displaced to an IGV correction position from a normal bias position in correspondence with a sensed turbine electrical load drop condition, and displaced back to a normal bias position following a correction time delay determined by the timer.

A method of reliably operating a gas turbine in accordance with this invention so as to maintain the turbine on-line during a loss of load condition includes the steps of sensing a loss of load condition for the turbine; supplying an inlet guide vane (IGV) correction signal into an air supply controller that is coupled to control the position of a plurality of turbine IGVs, the IGV correction signal being independent of other turbine operating condition signals applied to the air supply controller; and adjusting the position of the plurality of IGVs in response to the IGV correction signal so as to adjust the turbine fuel air mixture in the gas turbine to prevent flameout of turbine combustors during a loss of electrical load condition. The method typically further includes the step of removing the IGV correction signal after a correction time delay.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawing in which like characters represent like parts throughout the drawing, and in which:

The FIG. is a partial block diagram and a partial schematic diagram of gas turbine electrical generation system having a rapid acting gas turbine control system in accordance with one embodiment of this invention.

DETAILED DESCRIPTION OF THE INVENTION

A rapid acting gas turbine control system 100 comprises a turbine control unit 110 coupled to a gas turbine 50 as illustrated in the FIG. Gas turbine 50 comprises a combustor 52 in which a combustible mixture of fuel and air is burned. The energy liberated by the burning of the combustible mixture is at least partially extracted by the expanding gas mixture passing through expansion stages 54 of turbine blades to cause the blades to turn a drive shaft coupled to an electric generator 75. In this way the power output of turbine 50 is delivered to generator 75 to meet the electrical load on the generator.

In accordance with this invention turbine control unit 110 comprises a load rejection module 200 that enables control unit 110 to be rapid acting in event of a sensed turbine electrical load drop condition. As used herein, "turbine electrical load drop condition" and the like refers to the sudden removal of load from the turbine, such as precipitated by the opening of the generator output breaker. Such sudden load drop refers to an unloading of the turbine to a zero load condition; "zero load" refers to just turning the unloaded generator; "sudden drop" refers to going from a loaded to an unloaded condition within a period of time in the range of between about 1 second and about 2 seconds, with a concurrent speed variation from the turbine's synchronous speed (that is, the speed to maintain the setpoint electrical frequency from the driven generator). During a normal unloading of the turbine for a planned shutdown, the turbine is unloaded in a fashion so that the turbine synchronous speed is maintained. As used herein, "rapid acting" refers to the control system 100 responding to an electrical load drop condition in a fashion so as to maintain turbine 50 in an operating condition, that is, with combustion sustained in the turbine combustors so that is capable of being loaded (e.g., a flame out does not occur that shuts down the turbine).

Turbine performance (e.g., power output) is inferred from turbine condition signals (e.g., signals representing turbine operating parameters) such as turbine speed and exhaust gas temperature, and such condition signals are processed to generate respective regulatory function control signals in controller 110 to be applied to the turbine in order to regulate turbine operation. For example, turbine control unit 110 typically comprises a fuel supply controller 140 and an air supply controller 150 to generate respective fuel supply and air supply control signals. Fuel supply controller 140 is typically coupled to a primary fuel actuator 30 and a secondary fuel actuator 35; air supply controller 150 is coupled to an inlet guide vane (IGV) actuator 40 (as used herein, air supply controller refers to a controller for determining IGV position based upon turbine exhaust temperature feedback; other air supply controller regimes can be incorporated into control unit 110). These respective actuators govern admission of fuel and air into combustor 52 to form the combustible mixture. For example, IGV actuator 40 is coupled to IGVs 45 that govern the amount of air admitted to compression stages 47 of the turbine. Fuel supply controller 140 and air supply controller 150 thus collectively determine the fuel-air mixture supplied to turbine 50.

Control unit 110 is adapted to generate control signals to cause turbine 50 to operate in accordance with a desired operating regime. For example, turbine 50, when under load, is desirably operated in premixed operating regime in which fuel and air are thoroughly mixed before ignition (which assists in reduction of undesirable emissions); this operating regime further enables the operation of the turbine a fuel-air ratio that has an equivalence ratio of less than 1, and typically in the range between about 0.4 and about 0.6. The ignition in a turbine operating under load in the premixed regime is typically in a secondary zone 58 of combustor 52; in an unloaded condition, fuel and air flow are not sufficient to support full premixed operation and combustion occurs in a primary zone 56 of the turbine combustor.

Turbine exhaust gas temperature is the turbine parameter that is typically used for determining air supply to the turbine as the temperature of the exhaust gas is a function of the temperature in the reaction zone in the combustion chamber of the turbine. Turbine exhaust gas temperature is typically detected by a temperature sensor 112 comprising a set of thermocouples or the like and that is in turn coupled to a turbine exhaust temperature error circuit 130 in turbine control unit 110. Turbine exhaust temperature error circuit 130 comprises a processor for generating a turbine exhaust error signal; such a signal is generated by comparison of the actual value of the turbine exhaust temperature with a reference (or set point) value for turbine exhaust temperature. The reference value of exhaust temperature error is determined in a temperature reference processor 132 that is coupled to error circuit 130; the reference value is typically a function of various parameters such as turbine compressor discharge pressure, ambient temperature, and the like. Temperature error circuit 130 is coupled to air supply controller 150 to provide the turbine exhaust temperature error signal.

Turbine fuel supply control is accomplished with a feedback loop using turbine speed as the turbine condition signal (alternatively, additional parameter signals can be used for fuel control, such as electrical load on the driven generator (not illustrated in the Figure)). By way of example and not limitation, a turbine speed sensor 113 provides a turbine speed signal to a speed error circuit 120 to be combined with a turbine reference speed signal from a reference source 122. Speed error circuit 120 comprises a processor for generating a turbine speed error signal; such a signal is generated by comparison of the actual value of the measured parameter (actual turbine speed in this instance) with a reference (or set point) value for turbine speed. Speed error circuit is coupled to fuel supply controller to provide the turbine speed error signal to fuel supply controller 140.

Air supply controller 150 typically comprises a regulatory function processor such as a proportional-integral controller that is coupled to receive the turbine exhaust temperature error signal and to process the temperature error signal in accordance with a selected transfer function to generate an air supply signal (that is, control signal to position IGVs). Thus, for example, an exhaust temperature error signal indicating the turbine was rising above the reference (or set point) temperature is processed in air supply controller 150 to generate a corresponding air supply signal to increase air flow to the turbine to return the turbine exhaust temperature to the reference value. Air supply controller 150 is coupled to IGV actuator 40 so that the air flow control signal is applied to control the inlet guide vane angle of turbine 50.

Load rejection module 200, in accordance with the present invention, is coupled to air supply controller via a summing circuit 210 in which the output signal (if any) of load rejection module is combined with the output signal from temperature error circuit 130. As used herein, "summing circuit" and the like refers to a circuit to combine at least two signals and is meant to include design choice variations that can be made as to relative signs of various signals that are fed into the circuit.

Load rejection module 200 typically comprises programmable circuits in control unit 110 to provide the functions described below. Thus load rejection module 200 may be embodied, for example, in a programmable microprocessor, or alternatively in an application specific integrated circuit (ASIC); The elements of load rejection module described below thus typically comprise programmed processors but alternatively may comprise hard wired circuits (or other electrical or electromechanical devices) that provide the processing or data described. For example, switching can be accomplished by a program routine in a microprocessor, an electronic switch (e.g., a field effect transistor), a mechanical switch, or alternatively an electro-mechanical switch; the particular device used is selected based upon design criteria for a respective installation.

Load rejection module 200 comprises a turbine load sensor 220, a switch 230, at least one signal generator 250 and a timer 260. Turbine load sensor 220 typically is coupled to a breaker condition sensor 222 (e.g., a mechanical position sensor, a current flow sensor, a voltage sensor, or similar device) that is coupled to an electrical circuit breaker 80 to ascertain if an electrical circuit breaker is conducting electricity across the breaker or is in a non-conductive condition (e.g., open or tripped position). By way of example, circuit breaker 80 is illustrated as the breaker at the electrical output of generator 75 that is driven by turbine 50. Alternatively, other breakers in an electrical grid can be used for sensing purposes if opening of such breakers would be anticipated to affect turbine 50 to a degree that may potentially cause a flameout situation.

Additionally, load sensor 220 is typically also coupled to speed sensor 114 to receive a turbine speed signal. Load sensor 220 is further programmed to monitor turbine speed and acceleration so as to detect a loss of load condition from these parameters. For example, a loss of load condition typically is inferred from a load loss turbine speed (that is, e.g., a turbine speed above synchronous speed in the range between about 101.5% and about 103.5%) in conjunction with a load loss acceleration to the load loss speed in the range of between about 1% per second and about 4% per second. The load loss speed suggested above is typically below the overspeed shutdown point programmed into control unit 110 to provide an opportunity to return the turbine to controlled operation before a shutdown is necessary.

Turbine load sensor 220 is coupled to switch 230 so as to provide a turbine electrical load drop condition signal to the switch in the event breaker sensor detects that breaker 80 has opened during operation when turbine 50 is loaded with generator 75 generating electricity. Switch 230 has at least two position, one being an IGV correction position 232 in which the switch is disposed to couple an IGV correction signal to summing circuit 210. Switch 230 further has a normal bias position 234 that represents the normal operating condition (that is, other than a dropped load condition). Commonly, no signal is coupled to summing circuit 210 in the normal bias mode.

By way of example and not limitation, IGV correction signal is generated by signal generator 250, which typically is adjustable so that a desired magnitude of the IGV correction signal can be selected. The IGV correction signal is typically expressed in terms of degrees of temperature as that represents the relative units used in designing the operation of input for air supply controller 150 as described above. For example, the IGV correction signal typically is in the range between about 20° F. and about 40° F. of temperature error, with a sign selected to provide the desired effect in summing circuit 210, to provide a temperature error input to air supply controller 150 that would cause controller 150 to process that input and generate a turbine regulatory output signal that would lead to a more closed position of the IGVs (that is, positioning of the IGVs to reduce the amount of air supplied to turbine 50). The particular embodiment of the IGV correction signal is selected in the design process and may comprise, for example, a voltage signal, a current signal, or other characteristics of an electrical signal that can be selected to transmit information.

Timer 260 is further coupled to switch 230 such that switch 230 is displaced from IGV correction position 232 back to the normal bias position 234 in correspondence with a correction time delay signal generated by timer 260. This arrangement provides that the IGV correction signal provided by load rejection module 200 to air supply controller 150 in transitory (that is, the signal is transient, having a duration from the onset of load drop condition to the generation of the correction time delay signal by timer 260, a time that typically is less than the time that the breaker may be in the open or tripped position). The duration of the IGV correction signal is typically in the range of between about 3 seconds and about 20 seconds, with a particular value being selected by the designer of a particular installation based on assessment of the period that the correction signal must be applied to prevent a flameout condition in the turbine before the normal feedback loop (speed and temperature feedback loops for fuel and air controllers respectively) are able to again control operation of the turbine within a desired fuel-air ratio range.

In operation, the turbine control unit of the present invention provides for improved turbine performance by preventing flameout of the turbine 50 during a loss of electrical load condition. The problem presented for turbine 50 operating in the premixed regime (as described above) is the danger the turbine may be tripped off-line (that is, a protective shutdown of the turbine by reason of the controller detecting a full, or alternatively, a partial flameout in the combustors, or a protective shutdown that may result from an overspeed condition) in the event of rapid unloading of the turbine load, such as by opening of electrical breaker 80. Such a shutdown is undesirable from a commercial use standpoint (e.g., continued power generation) and from a turbine maintenance standpoint (no cooldown time). As the turbine desirably operates on the lean side of the stoichiometric fuel-air ratio (typically expressed with respect to mass of fuel and mass of air), the fuel reduction ordered by fuel controller 140 in response rapid unloading (in order to avoid an overspeed condition) can result in a fuel-air mixture that is too lean to support combustion, causing a flame out. It is desirable that the fuel air mixture be adjusted to a level to support a change from combustion in the secondary zone 58 of the turbine combustor to the primary zone 56 without loss of combustion (which change necessitates operation of igniters to initiate combustion in the primary zone). As the turbine air supply controller relies on turbine exhaust temperature as the turbine condition signal to provide feedback to the controller, the response time for air control is longer than the response time for fuel control (which relies on turbine speed as the turbine condition signal for the feedback loop), the normal air supply controller is not well situated to rapidly respond to a complete loss of load condition.

In accordance with the method of the present invention, in the event of a loss of load condition, turbine load sensor 220 of load rejection module 200 senses the loss of load condition for the turbine (e.g., by the breaker position sensor, the load loss turbine speed and acceleration sensor, or the coincidence of both indicators of loss of load condition) and causes switch 230 to shift from the normal bias position to the IGV correction position. Signal generator 250 provides the IGV correction signal that is summed with the turbine exhaust temperature error signal in summer 210, thereby immediately providing a modified temperature error signal to air supply controller 150 that is independent of the sensed turbine exhaust temperature; as used herein, the IGV signal being "independent" of turbine condition signal (e.g., exhaust temperature) refers to it being generated separately from the temperature feedback loop and not a function of the sensed turbine condition signal. The magnitude of the IGV correction signal results in air supply controller 150 generating a regulatory control signal to command closure of the IGVs (that is, positioning to reduce air flow to the turbine). As a consequence of the prompt reduction of air flowing into turbine 50, the fuel air mixture is maintained in a range that will continue to support combustion in the turbine. Thus, promptly starting to close the IGVs prevents the mixture from becoming too lean to support combustion as fuel supply controller begins to reduce fuel supply to the turbine in response to the sensed speed increase of the turbine following the opening of the electrical load circuit breaker.

The IGV correction signal is removed from summing circuit 210 when switch 230 is returned to the normal bias position by signal from timer 260 after the selected correction time delay. At this time, turbine operation has been substantially stabilized (at a no load condition) (or alternatively is close to being stabilized) such that the normal exhaust temperature feedback loop of air supply controller provides sufficient authority to be able to continue operations of the turbine in and on-line condition.

The device and method of the present invention thus provide means to rapidly adjust the fuel air mixture supplied to a turbine in a loss of load condition so as to maintain the turbine in a non-flameout condition even in the event of a rapid loss of electrical load, such as by the opening of an electrical circuit breaker on the generator driven by the turbine.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A rapid acting control system for a gas turbine in an electrical generation system, the control system being adapted for controlling fuel and air supply to the gas turbine over a range of operating conditions, so as to maintain the gas turbine in a non-flameout condition even in the event of loss of electrical load, the control system comprising:

a turbine control unit coupled to a gas turbine to receive a plurality of respective turbine condition signals, said turbine control unit further being coupled to said gas turbine so as to apply respective regulatory function control signals thereto; said turbine control unit comprising:

an air supply controller coupled to an actuator to control position of a plurality of turbine inlet guide vanes (IGVs) in correspondence with at least one of said turbine condition signals;

a load rejection module coupled to said air supply controller and coupled to a turbine electrical load sensor so as to generate an IGV correction signal, and to combine said IGV correction signal with a turbine condition signal to produce a modified turbine condition signal, said modified turbine condition signal applied to said air supply controller in correspondence with a sensed turbine electrical load drop condition.

2. The system of claim 1 wherein said turbine electrical load sensor is coupled to at least one of an electrical breaker condition sensor and a turbine speed sensor.

3. The system of claim 2 wherein said load rejection module comprises a switch coupled to said turbine electrical load sensor, said switch, having a normal operation bias position and an IGV correction position, said switch being coupled to said electrical load sensor so as to be positioned to said IGV correction position in correspondence with said sensed turbine electrical load drop condition.

4. The system of claim 3 wherein said load rejection module switch is further coupled to a signal source to provide said IGV correction signal, said signal source having a selectable strength to provide a selectable magnitude of said IGV correction signal.

5. The system of claim 3 wherein said load rejection module further comprises a timer coupled to said load rejection module switch so as to displace said switch from said IGV correction position to said normal bias position after a correction delay time, said correction delay time extending from the onset of said sensed turbine electrical load drop condition.

6. The system of claim 5 wherein said correction delay time is in the range between about 3 seconds and about 20 seconds.

7. The system of claim 3 wherein said turbine load sensor is coupled to at least said turbine speed sensor and is adapted to displace said switch to said IGV correction position in response to a load loss turbine speed in the range between about 101.5% and about 103.5% of turbine synchronous speed and an acceleration to said load loss turbine speed in the range between about 1% per second and about 4% per second.

8. The system of claim 1 further comprising a turbine temperature/processing means for comparing a reference turbine exhaust temperature signal and an actual turbine exhaust temperature signal so as to generate a turbine exhaust temperature error signal, said temperature processing means being coupled to said air supply controller and said turbine exhaust temperature error signal comprises said turbine condition signal provided to said air supply controller.

9. The system of claim 8 wherein said turbine control unit further comprises a summing circuit coupled to said turbine temperature processing means and to said load rejection sensor module so as to receive said turbine exhaust temperature error signal and said IGV correction signal so as to generate a sum said two signals, said summing circuit further being coupled to said air supply controller to provide the summed signal to said the air supply controller.

10. The system of claim 1 wherein said gas turbine comprises a primary combustor zone and a secondary combustor zone, said primary combustor zone providing for fuel and air premixing in said primary combustor zone and said secondary combustor zone providing for combustion in said secondary combustor zone of the fuel-air mixture during normal loaded conditions; said primary combustion zone providing for combustion in said primary combustor zone of the fuel air mixture during unloaded conditions.

11. A method of reliable operation of a gas turbine so as to maintain the turbine on-line during a loss of load condition, the method comprising the steps of:

sensing a loss of load condition for said turbine;

combining an inlet guide and (IGV) correction, signal turbine condition signal;

supplying the modified turbine condition signal into an air supply controller coupled to control the position of a plurality of turbine IGVs;

adjusting the position of said plurality of IGVs in response to said modified turbine condition signal so as to adjust turbine fuel air mixture in said gas turbine to prevent flame out of said turbine during loss of electric load condition.

12. The method of claim 11 further comprising the step of removing said IGV correction signal after a correction time delay.

13. The method of claim 12 wherein said correction time delay is between about 3 seconds and about 20 seconds.

14. The method of claim 11 wherein the step of sensing a loss of load condition comprises sensing an electrical output breaker condition.

15. The method of claim 11 wherein the step of sensing a loss of load condition comprises sensing a turbine speed signal and determining an acceleration value of a change of said turbine speed signal from a synchronous speed of said turbine.

16. The method of claim 15 wherein said step of supplying an inlet guide vane correction signal is performed in response to a load loss turbine speed signal in the range between about 101.5% and about 103.5% of said synchronous speed and said acceleration value is in the range between about 1% per second and about 4% per second.

17. The method of claim 11 further comprising the steps of:

generating a turbine exhaust temperature error signal by comparing actual turbine exhaust temperature with a selected turbine exhaust reference temperature, said turbine exhaust temperature error signal comprising one of said turbine condition signals supplied to said air supply controller; and producing a turbine air supply signal from said turbine exhaust temperature error signal.

18. The method of claim 17 wherein said IGV correction signal comprises a temperature error signal, said IGV correction signal being combined with said turbine exhaust temperature error signal prior to being applied to said air supply controller.

19. The control system of claim 1 wherein said turbine condition signal is a turbine exhaust temperature signal.

20. The control system of claim 1 wherein said IGV correction signal is transient.

21. The control system of claim 1 wherein said modified turbine condition signal is transient.

22. The control system of claim 1 wherein said IGV correction signal is independent of said turbine condition signal.

* * * * *